Nov. 3, 1931.     O. SMITH     1,829,969
TENSOMETER
Filed Feb. 21, 1930     3 Sheets-Sheet 3
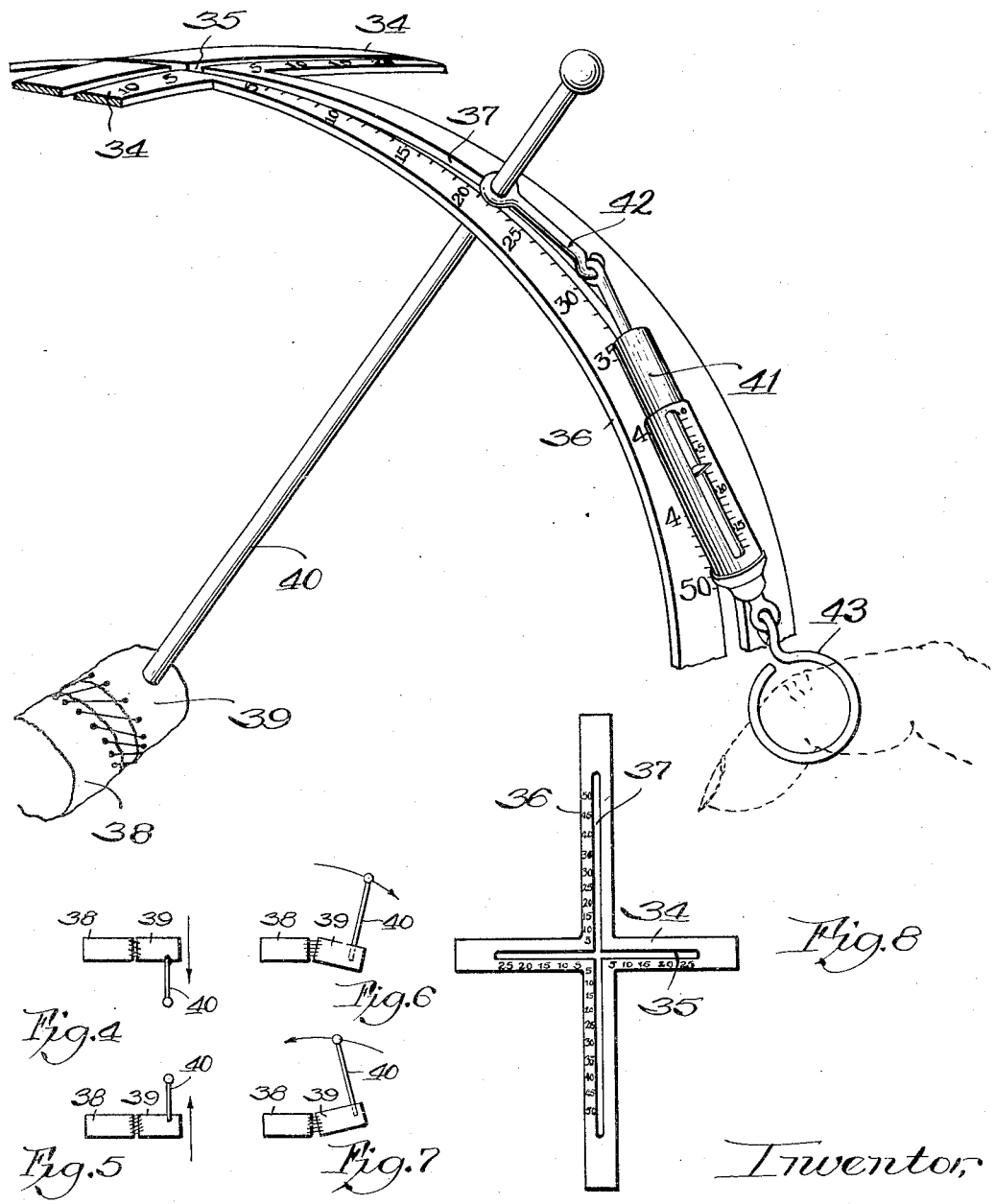

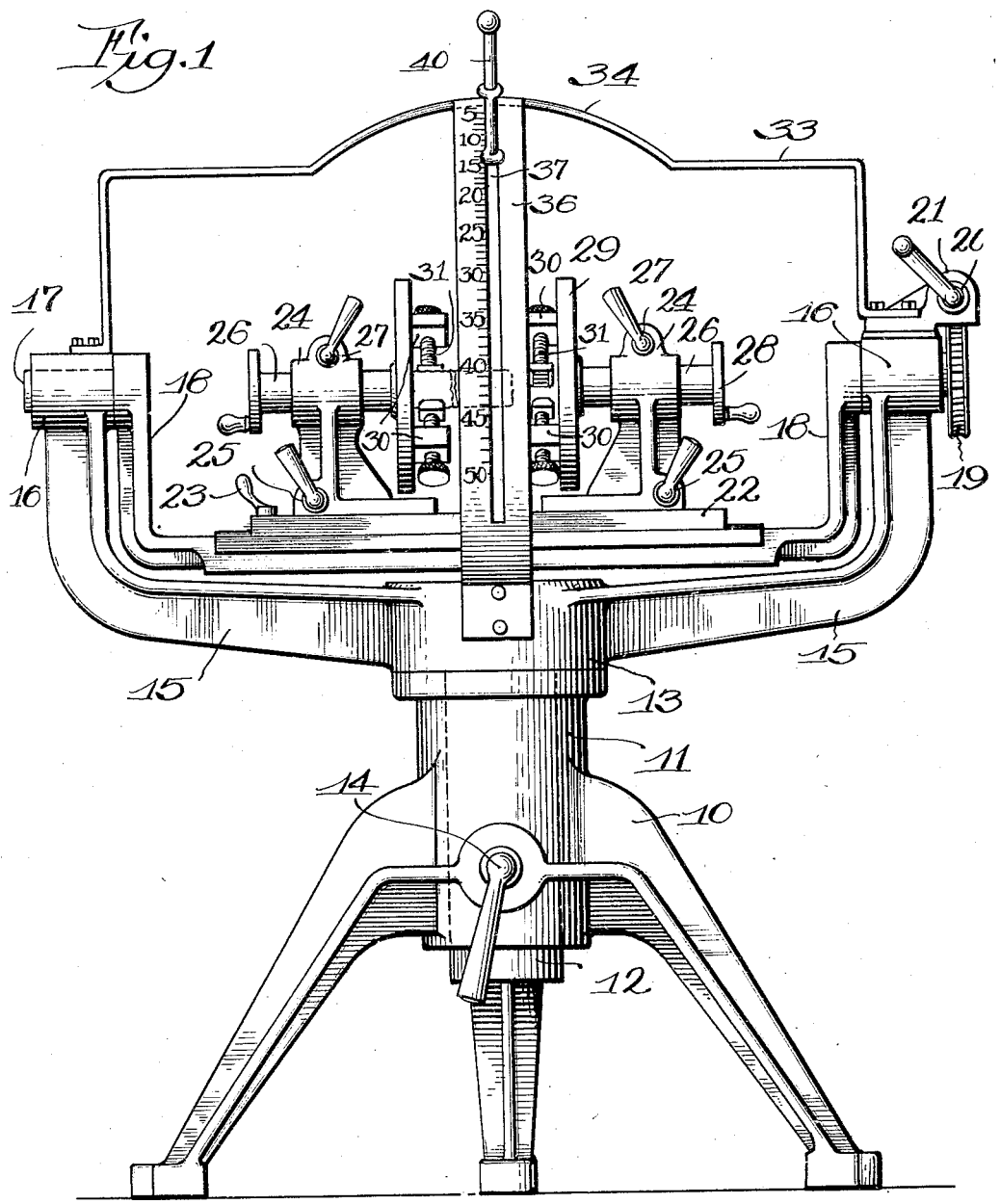

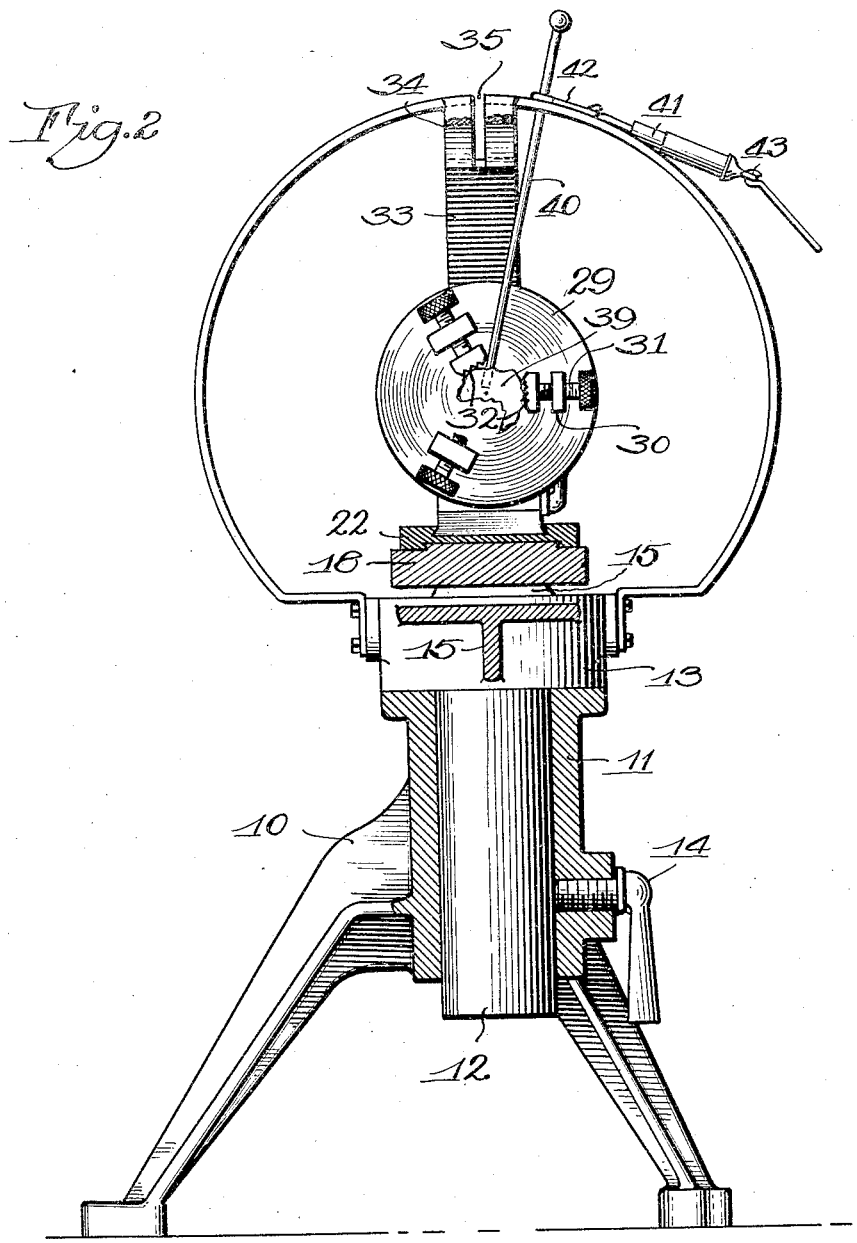

Patented Nov. 3, 1931

1,829,969

UNITED STATES PATENT OFFICE

OAKLEY SMITH, OF CHICAGO, ILLINOIS

TENSOMETER

Application filed February 21, 1930. Serial No. 430,212.

My present invention relates to the provision of an instrument which may be described as and called a tensometer. The parts or elements of the skeletal structure of the body are held together by ligaments, muscles and special membrane which bind the bones together and also act as protecting media to such vital pathways as nerves and arteries necessary to the metabolism and functioning of the adjacent parts and more remote parts which are connected by and supplied through particular articulations. Abnormalities of articulation, especially in the spine where the vertebrae carry and protect nerves from and to remote portions of the body, not only indicate local derangement but may be and often are accompanied by corresponding disturbances in the metabolism and functioning of remote portions of the body.

My instrument, as will hereafter be seen, permits of a scientific approach in an autopsical or post mortem examination and study of the physiology and pathology of joint motion. That is to say, with my instrument the extent of torsion or flexing of a particular articulation may be measured and the resistance to such torsion or flexing definitely ascertained whereby there may be compiled data in view of which the characteristics of a particular articulation may be dependably regarded as normal or abnormal for the part in question, and where the decedent is known to have suffered from a derangement of a particular kind and location accompanied by abnormalities of articulation which supply the deranged location a possible cause of the derangement is disclosed.

My specific object was to supply instrumentalities by means of which the extent of flexing and torsion and the resistance to flexing and torsion of the articulations of the bony structure of the body, particularly the vertebrae of the spine, can be measured in an autopsical or post mortem examination.

I have attained the foregoing objects and results by means of the structure illustrated in the accompanying drawings, in which—

Fig. 1 is what may be regarded as a side elevation of my instrument.

Fig. 2 is a view at right angles to Fig. 1 partially in central section.

Fig. 3 is a detail of the instrumentalities for measuring the extent of movement and power required in a torsion examination.

Figs. 4 and 5 are schematic illustrations of movements involved in torsion measurements.

Figs. 6 and 7 are similar schematic illustrations of movements involved in bending measurements; and Fig. 8 is a plan of the cross guides for the actuating rod.

Similar reference characters refer to similar parts throughout the several views.

Any form of mounting can be employed for my apparatus and that hereinafter described and illustrated is suggested as being dependable and convenient.

The base 10 is shown as consisting of three sturdy legs and this form is suggested as interfering least with a convenient approach to the apparatus. The legs of the base 10 are a part of and are joined by a hollow cylindrical center portion 11 in which rotates a depending stub shaft 12 of the table 13. A set screw 14 is provided for securing the shaft 12 after the table has been rotated to the desired position. The table 13 has integral arms 15 extending from opposite sides thereof which, at a requisite distance from the table, turn upwardly and terminate at their upper ends in the journals 16.

Co-operating with the journals 16 are stub shafts 17 which are united by a U-shape bracket 18. A worm wheel 19 mounted upon one of the stub shafts 17 co-operating with a worm 20 carried by bracket 21 secured upon the top of the adjacent journal 16 affords facilities for adjusting and maintaining the U-shape bracket 18 in desired position. The connecting portion of the U-shape bracket is gibbed upon its inner surface to receive the slide 22 held in adjusted position by the set screw 23.

The slide 22 is also gibbed to receive a pair of heads or stocks 24 similar to the tail stocks in a lathe. The heads or stocks 24 are secured in desired relation upon the plate 22 by screws 25 and the heads or stocks carry transverse shafts 26 which may be secured in adjsuted position by screws 27. The tails of the shafts or arbors 26 are provided with a disk and crank 28 for their more convenient manipulation and on the opposite ends of the shafts or arbors 26 are face plates 29. Extending from the faces of the plates 29 are stub blocks 30 which are bored and threaded for knurled headed set screws 31 upon the inner end of which are rotatably mounted gripping blocks or feet 22. The face plates with the blocks and screws carried thereby constitute a simple variety of chuck capable of receiving and securing a bone of unsymmetrical contour, which is one element of the articulation under investigation. One member of an articulation may be engaged in one of the chucks and the other in the opposite chuck, if so desired, and the heads or stocks 24—24 separated any desired distance on the slide 22 and the slide 22 moved to bring the entire set in satisfactory relation to the apparatus still to be described.

Secured to and extending between the journals 16 is a band or strap of metal 33, the central portion 34 whereof is curved upon an arc having as a center a point aligning with the shafts or arbors 26 and intermediate the journals 16. The curved portion 34 of the strap is slotted, as at 35, and the edges of the slot are scaled from the center, as best shown in Fig. 8, either in centimeters or inches, as may be desired. The marks and indicia may be made directly on the strap or upon a separate member and attached to the strap. The word "scale" as herein used, is intended to signify physical facilities or means for measuring distance.

From the center of the strap 34 extends at right angles other straps 36, the ends of which are secured to the table 13, and the center portion of the straps 36 are also slotted, as at 37, and scaled in a manner similar to the strap 34.

In examining, say, a single spinal articulation one of the vertebrae, shown schematically in Fig. 3, and designated 38, is secured in one of the chucks. The other vertebra 39 is transversely bored for the passage of a rod 40, the upper end whereof extends through either the slot 35 or 37, the head or stock being first adjusted so as to bring the rod 40 at the juncture of the slots 35 and 37 before torsions or flexings are commenced. The positioning of the scales around and at a distance from the articulation magnifies the relatively small movements in the articulation so as to permit of greater accuracy and easier reading.

A spring scale 41 is secured to the rod 40 by the link 42, the spring scale having on the opposite end thereof a finger ring 43, or some other convenient way of applying force thereto. By pulling the rod 40 through the spring scale 41 backward and forward in the slot 37, the articulation may be twisted or torted in opposite directions, as shown in Figs. 4 and 5, the extent of such movement being indicated on the scales opposite the slot 37 and the power necessary for causing the twisting being indicated by the spring scale 41.

For flexing or bending the articulation the rod 40 is drawn backward and forward by the spring scale 41 in the slot 35 so as to secure the action schematically illustrated in Figs. 6 and 7, the extent of movement and the power necessary for effecting it being indicated as heretofore described, except that the scales for these measurements are positioned adjacent the slot 35.

There are considerable variations in articulations which must be regarded as normal, but by measuring the characteristics of a sufficient number of normal articulations limits can be ascertained, a deviation from which will apprise the investigator that he has an unusual condition under investigation, which, in connection with a history of the case and microscopical examinations, will assist in disclosing the conditions actually present, and a systematized arrangement of data so secured will extend the possibilities of definite and dependable diagnosis by means of relatively simple manipulative methods.

Having described my invention what I claim as new and desire to secure by Letters Patent is:

1. An instrument for autopsical or post mortem examination of the articulations of the body comprising means for gripping an element of an articulation, a rod adapted to be secured to the other element of said articulation a slotted band for guiding the movement of said rod, a scale adjacent the said slot, and a spring scale coacting with said rod for the application of force to said rod therethrough.

2. An instrument for autopsical or post mortem examination of the articulations of the body comprising means for gripping an element of an articulation, a rod adapted to be secured to the other element of said articulation, slotted bands, the slots of which intersect, disposed at right angles for guiding the movement of said rod, scales adjacent the said slots, and a spring scale co-acting with said rod for the application of force to said rod therethrough.

3. An instrument for autopsical or post mortem examination of the articulations of the body comprising means for gripping an element of an articulation, a rod adapted to be secured to the other element of said articulation, slotted bands, the slots of which intersect, disposed in angular relationship for guiding the movement of said rod, and scales adjacent said slots.

4. An instrument for autopsical or post mortem examination of the articulations of the body comprising a pair of chucks having, axial and rotative adjustment for gripping the elements of an articulation, a rod adapted to be secured to an element of said articulation slotted bands, the slots of which intersect, disposed in angular relationship for guiding the movement of said rod, scales adjacent the said slots and a spring scale coacting with said rod for the application of force to said rod therethrough.

5. An instrument for autopsical or post mortem examination of the articulations of the body comprising a base, a yoke rotatively mounted in said base, a bracket rotatably mounted in said yoke, heads or stocks adjustably mounted on said bracket, arbors adjustably carried by said heads or stocks, chucks carried by said arbors, and slotted bands disposed at right angles and around the path of movement of said bracket and mounted upon said yoke, and a rod for attachment to an element of an articulation extending through and guided by the slots in said bands.

OAKLEY SMITH.